US012670813B2

(12) United States Patent
Yu

(10) Patent No.: US 12,670,813 B2
(45) Date of Patent: Jun. 30, 2026

(54) GLOBE

(71) Applicant: Rihua Yu, Yantai (CN)

(72) Inventor: Rihua Yu, Yantai (CN)

( * ) Notice: Subject to any disclaimer, the term of this patent is extended or adjusted under 35 U.S.C. 154(b) by 175 days.

(21) Appl. No.: 18/820,188

(22) Filed: Aug. 29, 2024

(65) Prior Publication Data

US 2024/0420597 A1      Dec. 19, 2024

Related U.S. Application Data

(63) Continuation of application No. 18/473,188, filed on Sep. 22, 2023, now abandoned, and a continuation of application No. PCT/CN2022/000027, filed on Feb. 23, 2022.

(51) Int. Cl.
*G09B 27/08* (2006.01)
*G09B 23/40* (2006.01)

(52) U.S. Cl.
CPC ............. *G09B 27/08* (2013.01); *G09B 23/40* (2013.01)

(58) Field of Classification Search
None
See application file for complete search history.

(56) References Cited

U.S. PATENT DOCUMENTS 6,464,502 B1 * 10/2002 Munekata .............. G09B 27/08
434/130
2009/0302983 A1 * 12/2009 Payne, III .............. G01V 3/081
335/297

* cited by examiner

*Primary Examiner* — James B Hull

(57) ABSTRACT

The present invention discloses a globe. A globe body of the globe consists of seven layers, i.e. layers A, B, C, D, E, F and G, of graticule structures from outside to inside, wherein layer A is composed of six large plates and boundary motion directions; layers B, C and D are mainly composed of an asthenosphere, a Benioff zone, a hot spot mantle plume, an Asian cold mantle plume, an African hot mantle plume and a South Pacific hot mantle plume; layer G performs circumferential displacement motion from east to west relative to an earth surface to stir layer E to perform a vortex motion structure from east to west; and an H structure is a Luhua earth motion center.

1 Claim, 6 Drawing Sheets

GLOBE

TECHNICAL FIELD

The present invention relates to the technical field of earth models, and particularly relates to a globe.

BACKGROUND OF THE PRESENT INVENTION

The earth is the common home of countless lives, and humans have lived on the beautiful blue planet for generations. From ancient people's understanding of the round Heaven and square Earth to the establishment of the heliocentric theory, from measuring the size of the earth to weighing its mass, from the confirmation of the earth rotation by the Foucault Pendulum to the understanding of climate change caused by the revolution throughout the four seasons, from understanding the existence of Moho Surface by seismic wave detection to earth stratification deep into the Gutenberg Surface, from the study of paleomagnetism to the verification of paleontological fossils, from the crossing of polar ice and snow worlds to the exploration of dark and deep oceans, all of these are the fruits from countless predecessors' hard exploration and continuous efforts in cognition, which fully demonstrates humanity's hope for understanding the earth.

Because the volume of the earth is huge for humans, in order to provide a more intuitive understanding of the earth, a globe was established. Different colors, shapes and symbols on the surface of the globe body to represent the oceans, lands, mountains, rivers, countries and regions, so as to display the global situation as a whole. With the development of various sciences and technologies, comprehensive exploration, measurement, research and analysis of the earth have been carried out through methods such as geophysics, chemistry, a gravity field, seismic waves and a geomagnetic field, and a deeper understanding of the earth has been gained.

However, nowadays, the cognition for the knowledge of the earth is based on fragmented presentations in the form of pictures, such as the division of various layers of the earth and the formation of cold and hot mantle plumes, and people's understanding of an earth interior are still in many controversies, and in this case, there is an urgent need for a comprehensive and reasonable earth model to deepen our understanding of the various conditions of the earth. Only in this way, we can have a correct understanding of the earth, make reasonable use of various resources, promote harmonious coexistence between humans and nature, and minimize the harm caused by natural disasters such as volcanoes, earthquakes and tsunamis to humanity. Therefore, the present invention provides a globe.

SUMMARY OF PRESENT INVENTION

The present invention aims to provide a globe, so as to solve the problems proposed in the above background.

In order to achieve the above purpose, the present invention provides the following technical solution: a globe, comprising main contents of the existing globe, and in particular to an earth model which further reveals a geological structure of an earth interior.

The globe was stratified by different wave velocities of seismic waves first discovered by Mohorovich, and is now divided into seven layers, which are represented by letters A, B, C, D, E, F and G; layer A represents a crust, which is in a solid state from an earth surface to a Moho surface; layers B and C represent upper mantles; layer B represents a Beyerle surface from the Moho surface to the bottom of an asthenosphere, wherein the asthenosphere is made of partially melted substances; layer C is from the Beyerle surface to a Rebotti surface; layer D represents a lower mantle from the Rebotti surface to a Gutenberg surface, and the mantle is made of a liquid-solid substance; layer E represents a liquid outer earth core and is in a liquid state from the Gutenberg surface to 4700 kilometers; layer F is an earth core transition layer from 4700 kilometers to a Lehmann surface; and layer G represents a solid inner earth core and is in a solid state from the Lehmann surface to an earth center. Layers B, C and D are provided with a hot spot mantle plume, an asthenosphere, a Benioff zone and a seismic wave low-velocity body; and an H structure is a Luhua earth motion center. The seven layers are proportionally reduced; graticules are made of iron wires according to latitude and longitude lines, and the graticules are used as skeletons to form a globe body; and the graticules are combined into a seven-layer graticule hollow globe body from inside to outside and from small to large in a manner that North and South Poles are co-axial. A piece of transparent plastic cloth is covered on the surface of the globe body.

The crust layer A is divided into a Eurasian plate, an African plate, an Antarctic plate, a Pacific plate, an American plate and an Indian Ocean plate according to the Wigner continental drift theory and the plate tectonics theory of Lepizong, Mckenzie and Morgan. Each plate is marked with different marks and motion directions.

According to the Hess and Dietz's theory of seafloor expansion, the global mid-ocean ridge is approximately 80,000 kilometers long, which is connected with the Indian Ocean V-shaped ridge from the Lomonosov Ridge in the Arctic Ocean to the mid-Atlantic ridge, and finally connected with the East Pacific Ridge. The ridges correspond to main mountain ranges and volcanoes in trench island chains, Benioff Belts, and earth suture lines, wherein the main island chains in the Pacific Ocean mainly include *Mariana*, Tonga, Japan, Kuril Islands, Aleutia, the Philippines, Ogasawara, Palau, Peru, Chile, Sino-American, etc. The Atlantic trenches include Puerto Rico, South Sandwich, Romance, Cayman, Dominica, etc. The Indian Ocean trenches include Amilant, Java, Vima, Obi, Mauritius, and Chagos. The Arctic Ocean trenches mainly include Litek and Ferrara, and the main mountain ranges include the Alps, Cordillera and the Himalayas.

According to the Wilson's hot spot theory, the main global hot spots in the mantle layers B, C and D include Hawaii, Samoa, Tubuai, Tuamo, Dawn Island, Easter Island, West Asia's Jamayne, Mount Emei, Ethiopia, Kenya, Reunion, Galkrone, Iceland, Azores, Cape Verde, Ascension, Fernando, Cameroon, Vesuvius, Yellowstone, etc.

According to the Morgan's mantle plume theory, there are Asian super-cold mantle plumes, South Pacific and African super-hot mantle plumes, as well as mid-Atlantic ridge and American primary mantle plumes all over the world.

The seismic wave low-velocity body comprises a South Pacific seismic wave low-velocity zone and an African seismic wave low-velocity zone.

According to various phenomena of the geomagnetic field, the motion states of an outer core and an inner core of the earth core layers E, F and G are determined. Based on the theory of the origin of the geomagnetic field proposed by Ramore, Elsa, Parker, Brad, Lilly, et al, it has been inferred that the Gutenberg surface is the location where weak current generates an original magnetic field, the liquid outer core of layer E is in a vortex motion state from east to west, and the vortex axis is a connecting axis of north and south magnetic poles, and the inner core is in a circumferential displacement motion state from east to west relative to the earth surface. It is determined by a continental magnetic field that Americas and Asia are downstream local vortex points, while Africa and the South Atlantic are upstream local vortex points, and are mostly abnormally associated with mantle plumes and a gravity field.

The transparent plastic cloth on the surface of layer A of the globe body is marked with marks, such as lands, islands, oceans, ocean trenches, mountain ranges and countries. The shapes of boundaries of plates are marked with iron wires; divergent boundaries are represented by opposite arrows; and collision boundaries are represented by relative arrows.

Layers B, C and D are provided with hot spot volcanoes, and a segment of iron wire in a direction from the earth center to the earth surface is arranged below all the hot spot volcanoes, and represents the hot spot volcanoes; a three-dimensional structure is made of iron wires according to a shape of an Asian cold mantle plume in FIG. 1, is arranged below Asia and represents an Asian super-cold mantle plume (3 in FIG. 1); and three-dimensional structures are made of iron wires according to shapes of a South Pacific super-hot mantle plume and an African super-hot mantle plume in FIG. 1, are arranged below South Pacific and Africa and represent the South Pacific super-hot mantle plume and the African super-hot mantle plume (4 and 7 in FIG. 1).

Layer E is provided with a vortex structure from east to west; three circular vortexes are made of iron wires according to shapes in FIG. 3, the circular vortex in the middle is larger, and the other two are smaller; and the three circular vortexes generally form the shape of a global body shown in FIG. 4, and represent a vortex motion state (15 in FIG. 1) from east to west of the liquid outer earth core. According to the geomagnetic map "NON-DIFOLE FIELD2000 Z (int 2000)" issued by International Association of Terrestrial Magnetism in 2000, an Asian magnetic anomaly structure, an African magnetic anomaly structure and a South Atlantic magnetic anomaly structure are arranged. As shown in FIG. 5, a vortex structure is made of an iron wire, the direction is represented by a down arrow, and the vortex structure is arranged at the range of layer E below Asia and represents an Asian magnetic anomaly local vortex structure (19 in FIG. 1) moving downwards from the earth surface to the earth center. As shown in FIG. 6, two vortex structures are similarly made of iron wires, the directions are represented by up arrows, and the two vortex structures are arranged at the range of layer E below Africa and South Atlantic and represent African and South Atlantic magnetic anomaly local vortex structures (18 and 17 in FIG. 1) moving upwards from the earth center to the earth surface. An H structure of the earth center is arranged in the center of the globe body, and as shown in FIG. 2, a shape of a spiral column is made of an iron wire and represents a circumferential displacement trajectory per year of an center point of the inner earth core; an iron wire segment longer than the spiral column is mounted in the middle of the spiral column and represents a vortex central axis of the liquid outer earth core, i.e. a magnetic axis; a point of the earth core is marked in the center; and the three parts jointly form the H structure, i.e. a structure (FIG. 2) of a Luhua earth motion center.

Finally, the globe body is connected with the bracket and the pedestal to form a whole globe.

Compared with the prior art, the present invention has the following beneficial effects:

The present invention provides a comprehensive and reasonable earth model, which is different from the traditional cognition in the following aspects:

The cognition manners of the earth interior are different: in the traditional cognition manner, seismic wave detection, physical measurement, chemical analysis and gravity field observation are adopted; and in the present invention, the motion laws of the earth core are determined by means of various data and phenomena of the magnetic field of the earth;

The energy sources are different: in the traditional cognition, it is generally believed that the main source of energy of the earth interior is generated by the decay of radioactive elements; and in the present invention, it is believed that the main source is universal gravitation;

The motion states of the inner earth core are different: in the traditional cognition, it is generally believed that the inner earth core rotates faster than the crust and rotates a circle faster than the crust in about four years; and in the present invention, it is believed that the inner earth core has circumferential displacement motion while rotating a circle faster than the crust in four years, and the displacement of the center of the inner earth core is one circle per day;

The motion states of the outer earth core are different: in the traditional cognition, it is believed that the outer earth core is in a radial convective motion state; and in the present invention, it is believed that the outer earth core not only has radial convective motion, but also has whole vortex motion from east to west by taking a rotation axis as a center;

The formation principles of the magnetic field of the earth are different: in the traditional cognition, it is believed that the geomagnetic field is generated by the radial convective motion of the outer earth core; and in the present invention, it is believed that the geomagnetic field is generated by the vortex motion of the outer earth core, while radial motion is the reason of formation of the continental magnetic field;

The generation manners of the geomagnetic field are different: in the traditional cognition, it is believed that the geomagnetic field has only one generation manner; and in the present invention, it is believed that the geomagnetic field has two different generation manners, i.e. a generation manner of an original low-intensity magnetic field and a generation manner of an enhanced magnetic field, and the two different generation manners supplement each other and work together to form the magnetic field of the earth;

The reasons of polarity reversal are different: in the traditional cognition, it is believed that this aspect is lack of awareness; and in the present invention, it is believed that the original low-intensity magnetic field has the change in direction, thereby causing the polarity reversal of the earth;

The motion states of the earth interior are different: in the traditional cognition, it is only known that the inner earth core is in a solid state, the outer earth core is in a liquid state, and the outer earth core has radial convective motion; and in the present invention, the specific motion process of the earth core is clearly specified, and the motion state of the earth interior is explained;

The cognitions of the center point of the earth are different: in the traditional cognition, it is believed that the center point of the earth is a geometrical center of the globe body; and in the present invention, it is believed that the center comprises three parts, i.e. the center point of the earth, the displacement trajectory of the center of the inner earth core and the vortex central axis of the outer earth core, and the three parts are renamed as the Luhua earth motion center.

The above theories are combined for deepening the understanding of various situations of the earth, so that humans can have a correct understanding of the earth, make reasonable use of various resources, promote harmonious coexistence between humans and nature, and minimize the harm caused by natural disasters such as volcanoes, earthquakes and tsunamis to humanity.

DESCRIPTION OF THE DRAWINGS

In FIG. 1: 1, graticule structures of layers A, B, C, D, E, F and G; 2, a direction of a magnetic field of the surface of negative electron flow is formed; 12, the original weak current generates a weak magnetic field that is outward perpendicular to the paper surface; 13, the gravitation of the sun causes the inner earth core to deviate from the center of the earth; 14, the relative motion direction of oblique radial circumferential displacement of the inner earth core; 15, vortex structure; 16, the liquid outer core radially cuts the original weak magnetic field to form enhanced current from east to west; 17, South Atlantic magnetic anomaly vortex structure; 18, African magnetic anomaly vortex structure; 19, Asian magnetic anomaly vortex structure; 20, South Pacific seismic wave vortex structure; 21, African seismic wave low-velocity zone; 22, center point of the earth; and 23, center point of inner earth core.

DETAILED DESCRIPTION OF PREFERRED EMBODIMENTS

Figure 1:
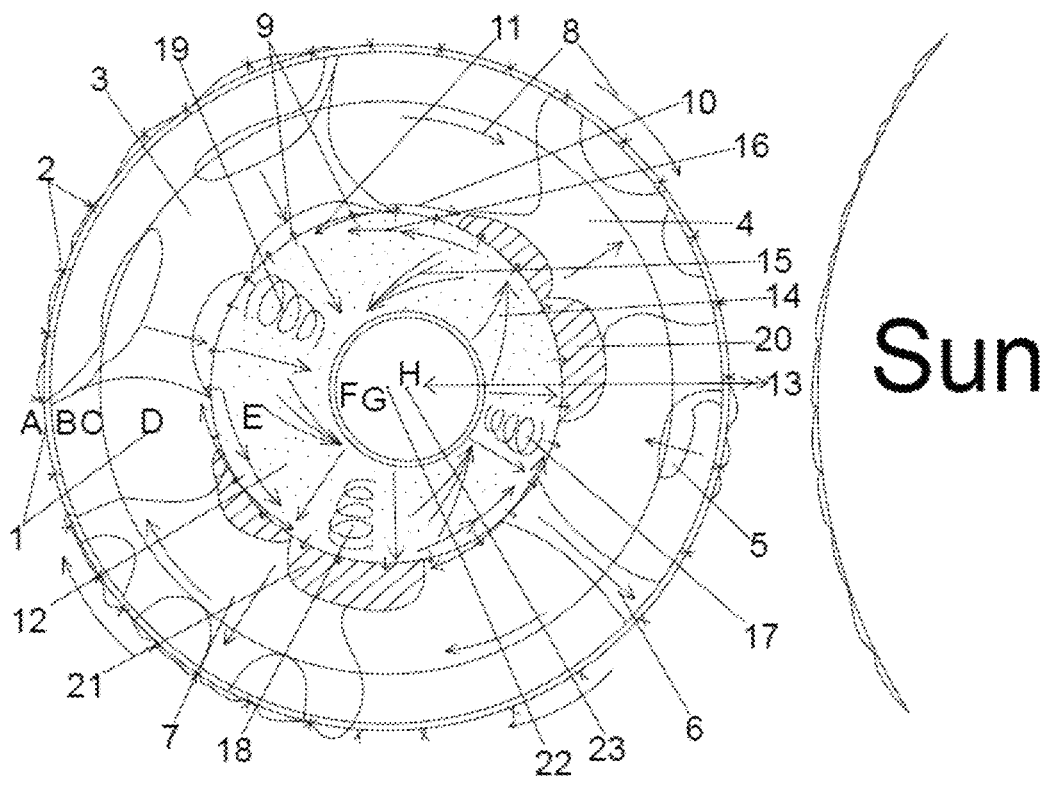
FIG. 1 is a detail drawing of laws of motion of each unit of an earth interior of the present invention.
Figure 2:
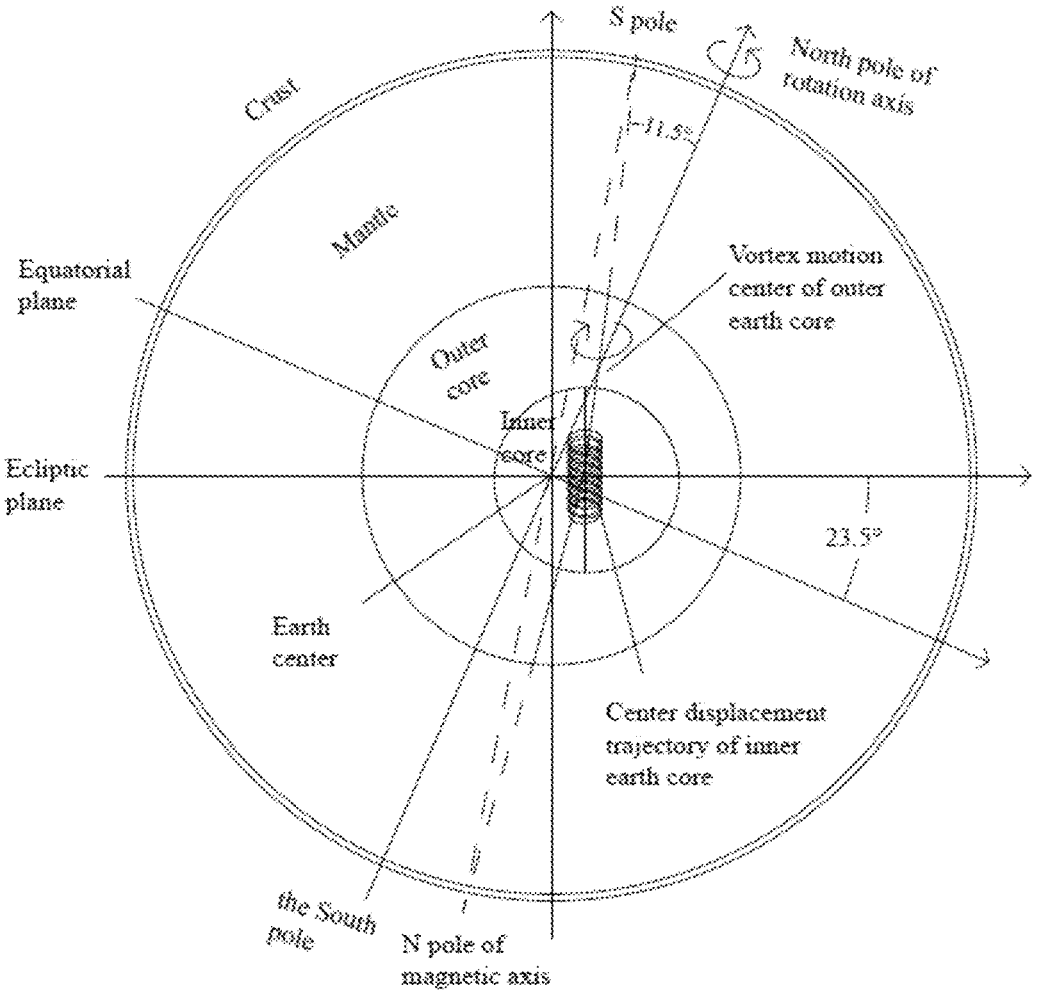
FIG. 2 is a trajectory graph of a Luhua earth motion center of the present invention.
Figure 3:
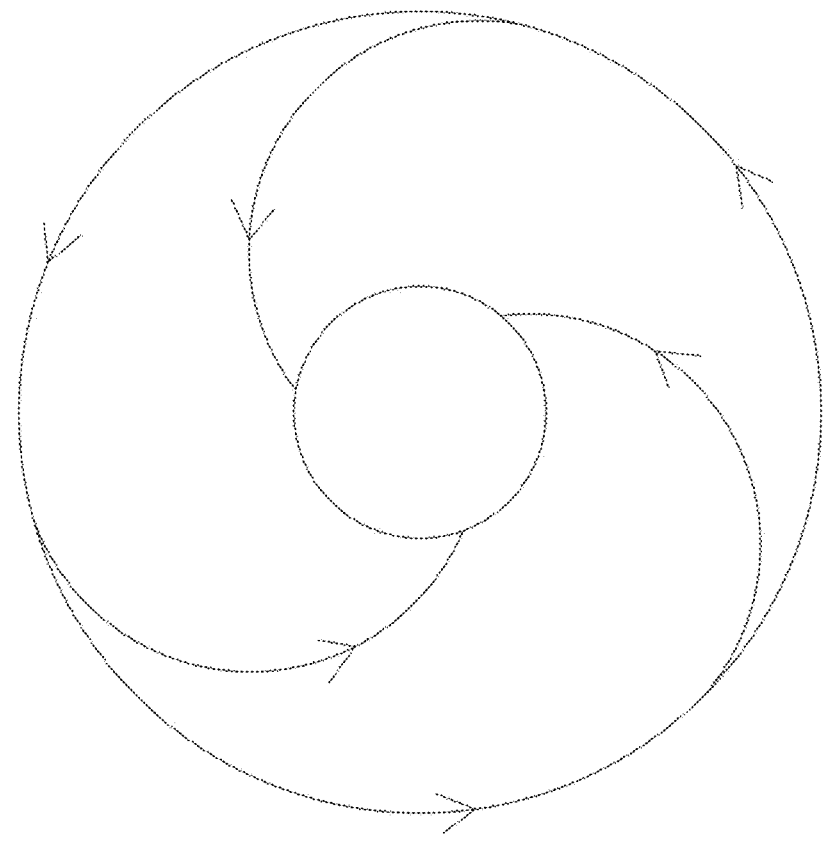
FIG. 3 is a planar graph showing that an inner earth core stirs an outer earth core to do a circumferential vortex motion structure (15 in FIG. 1) in the present invention.
Figure 4:
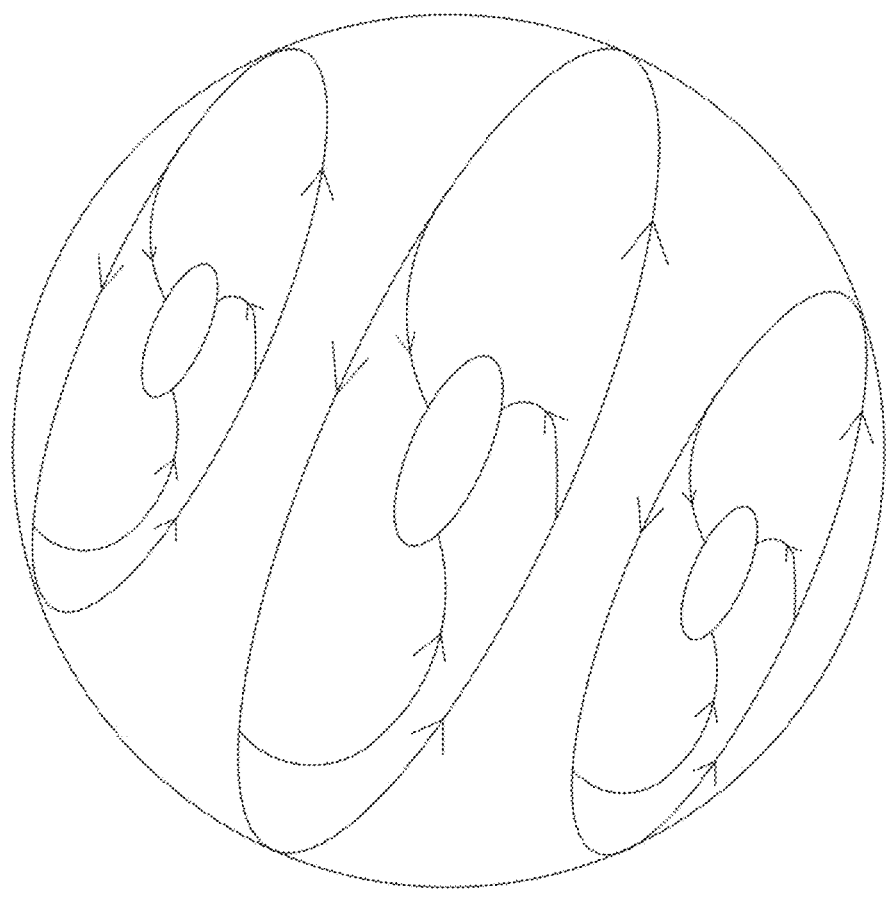
FIG. 4 is a three-dimensional diagram showing that an inner earth core stirs an outer earth core to do a circumferential vortex motion structure in the present invention.
Figure 5:
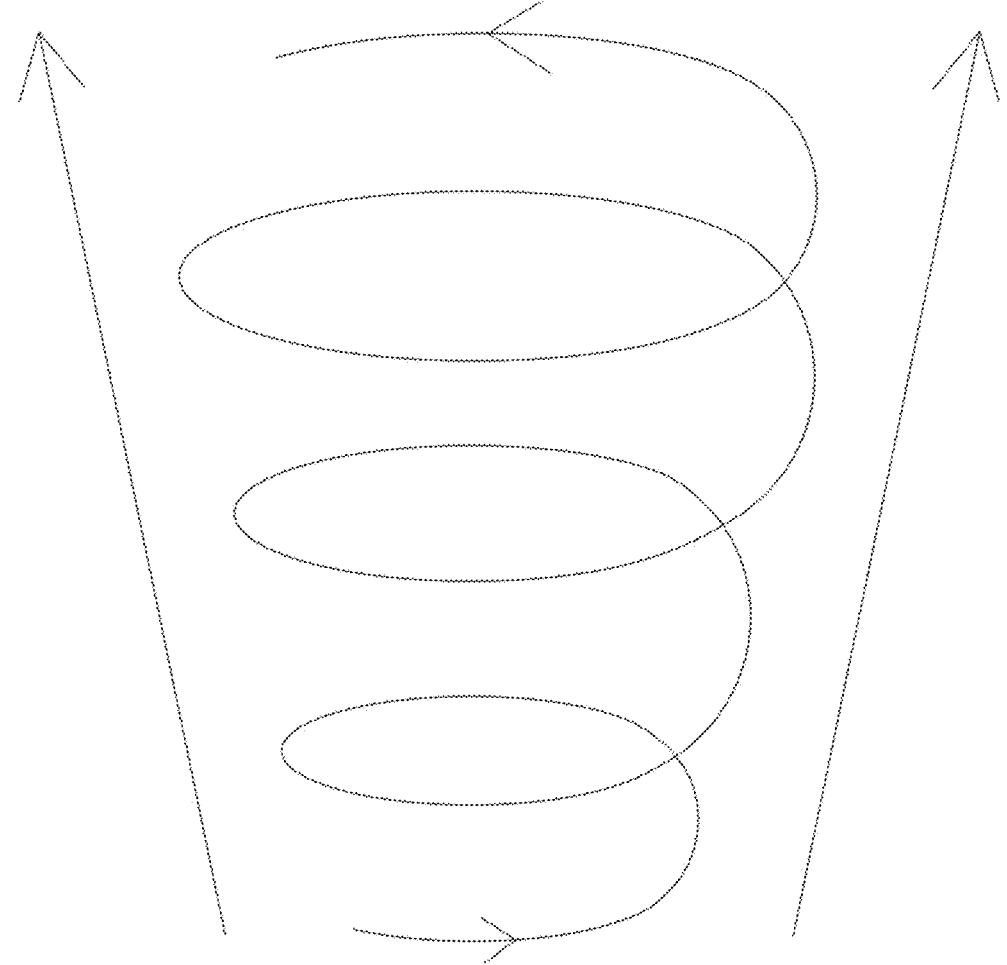
FIG. 5 is a detail drawing of an Asian magnetic anomaly vortex structure (19 in FIG. 1) of the present invention.
Figure 6:
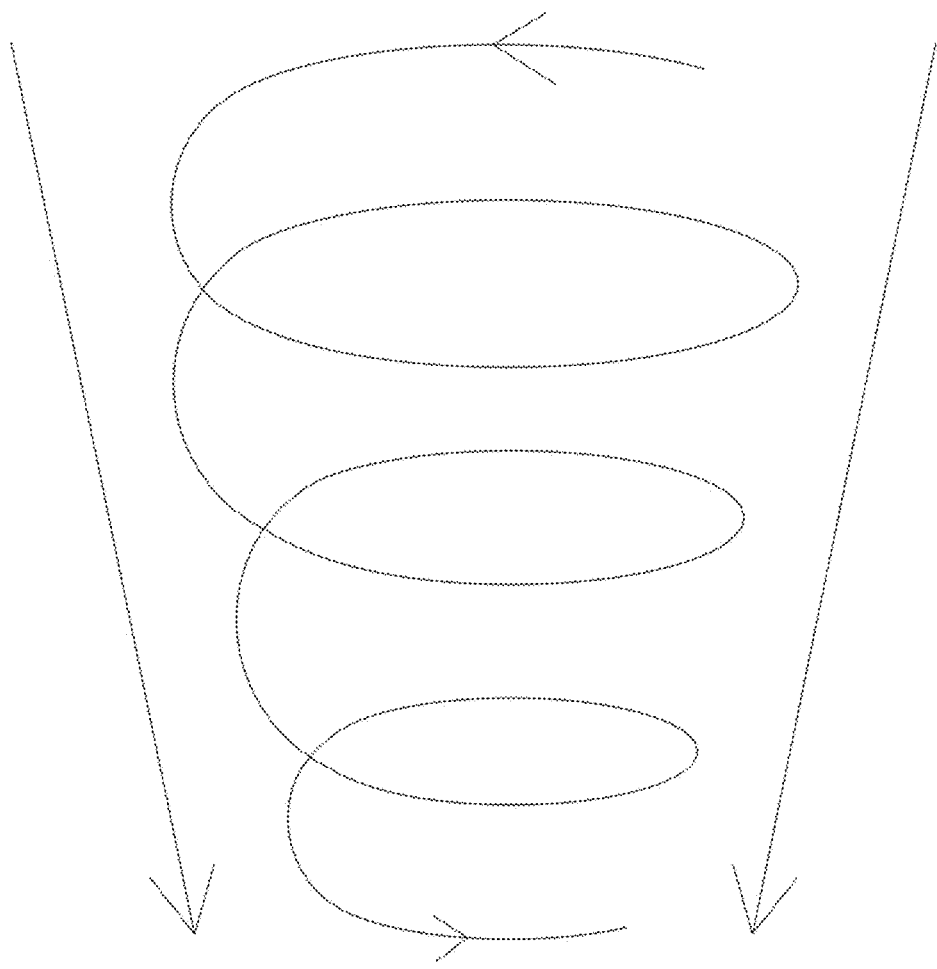
FIG. 6 is a detail drawing of an African magnetic anomaly vortex structure and a South Atlantic magnetic anomaly vortex structure (18 and 17 in FIG. 1) of the present invention.

In order to better understand the present invention, more detailed description will be made according to the principle of the present invention.

The various layers of the earth are mainly divided based on different seismic wave velocities. Next, a detailed table will be organized according to Brent Earth structure stratification in 1970.

| | Representative letter | | Layer name | Distance (km) | Longitudinal wave velocity m/s | Transverse wave velocity km/s | Density g/cm³ | State of substance |
|---|---|---|---|---|---|---|---|---|
| Crust | A | A' | Granitic layer Conrad surface | 0-10-33 | 5.6-7.0 | 3.4-4.2 | 2.6-2.9 | Solid state |
| | | A" | Basaltic Layer Moho surface | | | | | |
| Mantle | B | B' B" | Cap rock Asthenosphere Beyerle surface | 33-400 | 8.1-10.1 | 4.4-5.4 | 3.2-3.6 | Partial melting |
| | C | | BC is the upper mantle Rebotti surface | 400-1000 | | | | |
| | D | D' D" | Lower mantle Gutenberg surface | 1000-2900 | 12.8-13.5 | 6.9-7.2 | 5.1-5.6 | Liquid state-solid state |
| Earth core | E | | Outer earth core | 2900-4700 | 8.0-8.2 | No pass | 10.0-11.4 | Liquid substance |
| | F | | Transition layer Lehmann surface | 4700-5100 | 9.5-10.3 | | 12.3 | Liquid state-solid state |
| | G | G' G" | Inner earth core | 5100-6371 | 10.9-11.2 | | 12.5 | Solid substance |
| Earth center | H | | Luhua earth motion center | The center point of the Earth | The displacement trajectory of the inner ore center | The vortex motion central axis of the outer core | Three cores in one | Activity trajectory | the earth is inward perpendicular to a paper surface; 3, Asian super-cold mantle plume structure; 4, South Pacific super-hot mantle plume structure; 5, South American primary downward block; 6, mid-Atlantic ridge; 7, African super-hot mantle plume structure; 8, a clockwise rotation direction of the earth from west to east; 9, extra-core electrons of earth core substances detach from the earth core to enter the mantle; 10, free electrons that continuously enter the mantle form a negative electron flow from west to east along with the mantle; 11, the original weak current from east to west is formed at the boundary of the core mantle while the In 1912, Weigner proposed the theory of continental drift based on the complementarity between the two sides of the Atlantic, such as the right angled protrusion on the east coast of Brazil and the right angled depression on the west coast of Africa in the Gulf of Guinea. The Americas and Africa as well as Europe echo each other in terms of stratigraphic and rock structures, for example rock sequences are consistent with the fossils contained in the Late Paleozoic tectonic direction in the southern tip of Africa and southern Argentina in South America. Paleontological fossils on both sides of the Atlantic Ocean have a genetic relationship, such as the Middle Dragon fossil and the Cambrian plant fossil Tongue Sheep Teeth. Extensive glaciation occurred in South America, southern Africa, India, and Australia during the Permian period, while there were no traces of the same period in other places, which indicates that these areas were once a continent, proving that land was active. Modern technological measurements have also proven that continents move at a speed of 2-10 mm per year.

In 1962, Hess and Dietz proposed the theory of seafloor expansion, which believes that mantle substance passed through the lithosphere along the mid ocean ridge to form a new oceanic crust, the original oceanic crust are expanded toward the trench island arc line on both sides, so as to rush into the mantle to renew the ocean floor every 200 million years. Evidences are that (1) in 1963, Wayne and Mathews discovered that the magnetic anomaly in the mid-ocean ridge was in striped positive and negative crossing, parallel to both sides of the ridge, symmetrically extends, and its sequence is consistent with the geomagnetic reverse chronology; (2) in 1965, Wilson proposed a transformation fault to prove the horizontal displacement of the plate; (3) in 1949, Benioff discovered that the distribution of focal depths formed a tilted zone from the ocean to the continent; and (4) Lang Cohen discovered that ancient magnetic poles migrated with geological age based on residual magnetism of rocks.

In 1967, Morgan, Mckenzie, Lepishun et al proposed the theory of plate tectonics, which believed that the earth surface was divided into block bodies with different sizes by many active zones such as mid-ocean ridges, trenches, transform faults, earth sutures and continental rifts. The plate was separated and expanded in the mid-ocean ridge, and undergoes subduction and subduction at the Fu Chong belt and the suture line. The world is divided into six major plates such as Eurasia, the Americas, Africa, the Pacific, Australia and *Antarctica*, and several small plates.

In 1963, Wilson proposed the concept of hotspots to explain the age evolution of volcanic island chains. There are three hot spot trajectories in the Pacific Hawaii-Emperor Ridge, Lane-Tuamoto Ridge, and Tubai-Gilbert-Marshall Ridge. There are also hotspots on lands, such as the White Annaben-Principe-Cameroon volcano.

In 1972, Morgan proposed the concept of mantle plumes to explain the origin of hotspots and found that areas with high gravity on the global gravity map were areas where plate growth and volcanic distribution occurred. Most of the global hot mantle plumes are located at the inflection points or triple junctions of the mid-ocean ridge, with a few located within the plate, about 50 or so.

In 1994, Maruyama Maude proposed the theory of mantle plume structure that there are mainly two upwelling super-hot mantle plumes in the South Pacific and Africa, as well as secondary hot plumes in the Mid Atlantic Ridge, as well as declining cold mantle plumes in Asia and secondary cold plumes in the Americas and *Antarctica*. There are two huge low wave velocity anomaly zones in the South Pacific and Africa regions, and a high wave velocity anomaly zone below Asia. The convection of cold and hot mantle plumes is a main form of heat conduction inside the earth and runs through the entire evolution process of the earth.

The large-scale magma controlled by the mantle plume is erupted from earth surface to form a huge area of overflow basalt, also known as the Great Igneous Province. Like the Great Igneous Province of Northwest Leah, with an area of $2.5 \times 10^6$ km². There are also the Mountain Emei Igneous Province and the Deccan Plateau. In the mid Jurassic period, the South Atlantic Great Igneous Province caused the Gondwana continent to split, and the Great Igneous Province was mostly closely related to mass extinctions and impacts against asteroids.

In the process of deepening the understanding of the earth, there is the understanding of another phenomenon that is also a golden key to opening the door to the interior of the earth, called the magnetic field of the earth.

The law of motion of the crust is mainly revealed by continental drift, seafloor expansion, and plate tectonics. The law of motion of the mantle is mainly displayed by hotspots, mantle plumes, and cold and hot super polar mantle plumes, and the law of motion of the earth core is mainly determined based on the laws of the magnetic field of the earth.

People have known about the geomagnetic field for more than 2000 years. Sinan, recorded in the Ancient Mineral Record during the Warring States Period in ancient China, makes use of the principle of mutual attraction between magnetic field and magnet, and is one of the Four Great Inventions in ancient China. The existence of magnetic declination is clearly recorded in "Mengxi Bi Tan", by Shen Kuo from the Song Dynasty. In 1600, Gulbert was the first person to propose the concept of geomagnetic field theory. In 1893, Gauss established a mathematical method for describing the geomagnetic field. The theory of the origin of geomagnetic field can mainly reasonably explain various phenomena related to the geomagnetic field, that is, various conditions for determining the origin of the geomagnetic field are as follows:

1. Comply with the distribution law of a dipole magnetic field; the distributions of various factors formed by magnetic fields generated by placing the dipole magnetic field and a magnetic rod inside the earth are the same. For example, there are two north and south magnetic poles and a magnetic equator, the intensity of the magnetic field is 0.3-0.4 Gauss at the magnetic equator, which gradually increases towards both poles and reaches 0.6-0.7 Gauss near both poles. The magnetic inclination angle is zero at the magnetic equator and +90° at both poles.

2. Comply with the limitations of the Curie point; because a magnet loses its magnetism after being above the Curie point, the Curie point of the magnet is 770° C. which can be reached at 25 KM underground. The temperature inside the earth core is even higher at 4000° C.-6000° C., so it can only be an induced magnetic field formed by earth currents.

3. Comply with the basic laws of electromagnetics; according to the geomagnetic North Pole near the geographical South Pole, the direction of the earth current is determined to be similar to the latitude line from east to west. The basic principle of current is the directional movement of charges. The basic method of generating the induced current is that a part of a conductor of a circuit is closed to do the motion cutting the magnetic induction line, so as to generate the induced current. Its characteristic is the law of Lunce, which increases and decreases the same.

4. Comply with the known geological laws of motion of the earth; by measuring the mass of the earth, it is known that the average density of the earth is 5.5 g/cm³, and the density of the lithosphere is 2.5-2.7 g/cm³. Through the abundance density and formation of cosmic elements, it is determined that the majority of the earth core is composed of iron and nickel. According to seismic shear waves, the outer core cannot be determined as liquid. Based on the annual movement distance of the crustal plates being 2-8 cm, and the magnetic anomaly units and magnetic pole movement scale being 20-30 km per year, it is determined that the generation site of geomagnetic field is the earth core. The geomagnetic field and the geological laws of motion are mutually consistent, complementary and defined.

5. Reasonable magnetohydrodynamic generator hypothesis and free electron rotation hypothesis; since the geomagnetic field is generated in the outer earth core which is a high-temperature and high-pressure liquid metal fluid, the magnetohydrodynamic generator hypothesis and free electron rotation hypothesis are relatively reasonable. In 1945, based on the principle of a magnetohydrodynamic generator, Elsa, Ramore, Parker, Brad, Lilly, et al proposed that when the liquid outer earth core moves in the initial weak magnetic field, the current is generated like a magnetohydrodynamic generator, and the magnetic field generated by the current strengthens the original weak magnetic field. The free electron rotation hypothesis suggests that electrons outside the atomic nucleus of substances at high temperatures and pressures will be accelerated to escape outward, resulting in a negative electric field generated by the earth rotation, which in turn generates a magnetic field. The magnetic field strength generated by this hypothesis is too weak. The independent existence of these two hypotheses has shortcomings. Now, the two hypotheses are merged, that is to say, the weak magnetic field generated by the rotation of free electrons is supplemented as the initial weak original magnetic field in the magnetohydrodynamic generator hypothesis, so that this hypothesis is further improved. Now, only the issue of energy sources is remained.

6. Reasonable energy sources; there is no reasonable explanation for the problem of power sources in the theory of origin, from continental drift to global mantle plume structure to the geomagnetic field. People have considered various possible energy sources, such as the decay of radioactive elements, the residual heat generated during the formation of the earth, gravitational differentiation, the solidification of the core, the energy for the mantle to drive the earth core to move, etc., which are not accepted by people, and there is still an unresolved circular loop problem, indicating that there is another source of power.

7. Comply with the theory of concentric magnetic axes: in paleomagnetism, the location maps of over a thousand ancient magnetic poles have been calculated based on the observation results of volcanic rocks around the world for 20 million years. These geomagnetic poles are distributed based on a geographical pole as a center, and on average, the ancient magnetic field is an axial dipole geocentric field for 20 million years, which indicates that the magnetic axis is related to the earth rotation axis and that the formation of the magnetic field is closely related to the earth rotation.

8. Comply with the law of the earth revolution and rotation; the earth rotates while also revolving around the sun. Conduct an experiment by tying a rope around the mouth of a bottle containing water and a small iron ball to perform a lifting motion. The small iron ball inside the bottle leans towards the bottom of the outer end of the bottle due to the inertial centrifugal force. Based on this, it can be determined that the inner earth core deviates from the center of the earth when the earth revolves around the sun. Due to the continuous rotation of the earth, the center of the inner earth core continuously deviates from the center of the earth, that is, the earth rotates one circle and the center of the inner earth core continuously deviates from the center of the Earth one circle, in this way, the inner earth core can form a displacement movement relative to the earth surface. We can also understand in this way that the bottle containing water and an iron ball lies on the table, the iron ball sinks to the lower part due to the gravity of the earth being greater than the gravity of the small iron ball itself, and the bottle is rolled to the right, the small iron ball will also move to the right. Relative to the outer wall of the bottle, the center of the small iron ball performs displacement from right to left, and water in the bottle moves from right to left. Since the mass of the sun is 330,000 times that of the earth, which is much greater than that of the earth, the inner earth core will lean towards the sun due to the gravity of the sun being greater than the own universal gravity of the earth. Under the action of the earth rotation from west to east, the inner earth core will generate a circular displacement motion relative to the earth surface from east to west, thereby driving the liquid outer core to perform a vortex motion from east to west. Whether due to inertial centrifugal force or solar gravitational eccentric force, it can cause the inner earth core to deviate from the center of the earth, resulting in circular displacement motion, but the ultimate source of force is universal gravity. At the same time as the inner core undergoes circular displacement, the outer core mantle crust forces the inner core to return to the center of the earth, and the reaction force that forces the inner core to return to the center of the earth is the main driving force for the westward drift of the continent. The inner earth core drives the outer core to engage in vortex motion, which plays a stirring role. The direction of the force is from the inner diameter to the outer diameter, while the reverse force is from the outside to the inside. This creates an enhanced current by cutting the original weak magnetic field through the vortex motion of the outer core, which in turn generates a geomagnetic field. While stirring the outer core, a large amount of thermal energy is generated, and then kinetic energy is provided for convection in the mantle plume, leading to plate drift in different directions. This not only explains the power source of continental drift, but also the energy source of the geomagnetic field, and can explain various known phenomena of the geomagnetic field.

9. Explain the reason for the formation of magnetic declination; the outer core of the earth is liquid, and the power generated by the earth revolution and rotation cannot be rigidly transmitted to the inner earth core, but can only be transmitted through the flexibility of the liquid. Therefore, the universal gravitation of the sun causes the circular displacement motion of the inner core to generate the outer core to do vortex motion to generate the magnetic field. In this process, the inner core right faces the sun, while the earth rotates to be tilted towards the ecliptic plane. They has difference to form a magnetic declination angle, the inner earth core receives a carrying force from the earth itself while receiving the gravitation of the sun, so that the vortex motion posture of the outer core is constantly adjusted, thereby causing magnetic pole movement and magnetic declination change.

10. Explain the reasons for the formation of non-dipole magnetic fields; the geomagnetic field is generated by a fact that the inner core stirs the outer core to do vortex motion, such the process is that the liquid radially cuts the an enhanced magnetic field generated by the original weak magnetic field, that is, as long as the liquid moves radially, a new magnetic field will be generated. In the process of stirring the outer core, the inner earth core also converts gravitational potential energy into thermal energy through friction, and then generates motion vortices from the inside to the outside. Similarly, the substance entering the outer core due to gravitational differentiation in the mantle causes vortex from outside to inside, the two types of vortexes generate local magnetic field anomalies, and this continental magnetic field is often associated with mantle plumes. For example, the African magnetic anomaly corresponds to the African super-hot mantle plume, while the East Asian magnetic anomaly corresponds to the Eurasian super-cold mantle plume.

11. Explain geomagnetic westward drift; the westward drift of the geomagnetic field is one of the most important characteristics of long-term changes in the geomagnetic field, and is also one of the testing indicators of the theory of geomagnetic origin. It includes a magnetic declination, a zero bias line, a non-dipole magnetic field, and an equivariant line. The geomagnetic field is generated by a fact that the inner core stirs the liquid outer core to do vortex motion from east to west, and each unit of the geomagnetic field naturally flows westward with the liquid to generate westward drift, but the drift speed is much lower than the liquid moving speed.

12. The reason for the difference between the drift rates of westward drift of the geomagnetic field in different regions; the difference is related to the formation of non-dipole magnetic field. There are two ways to form continental magnetic fields. One way is that energy substances are released from inside to outside to form magnetic anomaly generated by radial movement. If Africa is abnormal, its main location of formation is in the outer earth core, so the movement with the earth core is faster. One way is that substances enter the outer core from the mantle to form the magnetic anomaly generated by the radial movement, such as the East Asian continental magnetic anomaly, whose main formation body is determined by the mantle, and the mantle is relatively immobile; the resulting continental magnetic anomaly movement is relatively small. In addition, the motion state of the outer core is poor, so the different positions of the continental magnetic field also determine the different westward movement rates.

13. Explain the reason for the movement of the magnetic pole: the geomagnetic field is generated by the inner core driving the outer core to perform the vortex motion, and the force is exerted by the sun. Under the combined action of the earth rotation, the inner core is displaced, thereby driving the entire outer core to rotate in a spherical shape from east to west, the magnetic axis is the vortex axis, and the magnetic pole is the intersection point where the vortex axis extends to the surface. In the process of earth movement, it also includes the movement of the earth core, so that the movement posture of the earth core is continuously adjusted and then causes the magnetic pole to move. Because the magnetic axis is formed by the earth rotation and revolution, both of them generally coincide.

14. Explain the reason for the difference between movement rates of the north and south magnetic poles; in recent years, the annual movement rate of the North magnetic pole has been accelerated and reaches 55 kilometers per year, even affecting people's daily travel and attracting people's attention. However, the movement of the South Magnetic Pole is relatively slow, at over 10 kilometers per year. The main reason for its formation is that there are two magnetic anomalies near the North Pole. One is the downward vortex in East Asia, which is responsible for the drag of the Arctic vortex. The other is the push of the Arctic vortex by the upward vortex near the North Atlantic in Canada, in combination with the self-adjustment of the earth core, which jointly drives the rapid movement of the North Pole.

15. Explain that the daily movement trajectory of the northern magnetic pole is elliptical; this is direct evidence of the circular displacement motion of the inner earth core. The magnetic pole is the central axis of the magnetic field, also known as the outer core vortex axis. The outer core vortex is caused by the inner core, so the daily trajectory of the magnetic pole is related to the movement of the inner core.

16. Inversion of polarity of geomagnetic field; the inversion of the polarity of the geomagnetic field is one of the main research achievements in paleomagnetism and an important test mark for the theory of the origin of the geomagnetic field. The geomagnetic field is formed by earth current, and the basic form for current generation is that a part of the conductor of the closed circuit performs the motion of cutting the original magnetic field. The conditions for the formation of current here are as follows: (1) a closed circuit, (2) a part of the conductor cuts the magnetic induction line, and (3) the original magnetic field. In the geomagnetic field, the liquid outer core is equivalent to that there is no turning direction problem in the closed circuit. The vortex motion of the liquid outer core undergoes radial motion, which is equivalent to that a part of the conductor performs the cutting motion. This is caused by the displacement of the inner core stirring the outer core, and the displacement of the inner core is caused by the gravitation of the sun and the rotation of the earth. As the sun cannot move westward, the direction of cutting the magnetic induction line cannot be changed. Now, the only condition for changing the direction of the current is the original magnetic field, which means that the inversion of the polarity of the geomagnetic field is formed by change in the direction of the original magnetic field. The original magnetic field is formed by change in the direction of the original weak current, and the fundamental reason for the change in the direction of the original weak current is that electrons outside the atomic nucleus that make up the substance can move freely. We consider the earth core as a large atom, when the earth core undergoes circular displacement to drive the vortex motion of the outer earth core, converts gravitational potential energy is converted into thermal energy at the same time, so that the electrons outside the core to gain kinetic energy and escape to the mantle. As the earth core continuously moves, the electrons that escape continuously form a negative electron flow from west to east, that is, a weak current is formed from east to west at the boundary of the mantle to generate the original weak magnetic field. Because the volume of the earth core is limited, when the large atom of the earth core loses all the electrons that can be lost, the continuously generated heat energy is transmitted to the mantle, so that the electrons in the mantle form free electrons so as to be recaptured by the earth core, in such the way, a reverse current is formed, thereby changing the original magnetic field, and the resulting time span is called the period.

17. The Gothenburg event during the Brunhes positive period; there is a polarity event in the current Brunhes positive period, i.e., a reverse event occurring in 13750 and 12350. It was named according to research on Gothenburg Glacial varve. The evidence of this shift was also found in the drilling survey of the Dongfang Square in Wangfujing, Beijing, and during the same period, there was Younger Dryas climate change event; extinction events of large animals such as mammoth and saber toothed tiger also occurred, which were related to the disappearance of the Crovis people in North America. Experts have found peaks of platinum during the same period in ice cores in Greenland, even in Europe, West Asia, North America, and Patagonia in South America, which is determined to be formed by meteorite impacts, and a meteorite crater with a diameter of 31 km was found in the northern Warsaw Glacier in Greenland. The edge of the crater was newly formed, and there were no ice cores in the area for over 12,800 years, indicating that this crater was related to the Younger Dryas meteorite impact. The direction of forming the original current is determined by the direction in which free electrons entering and exiting the boundary of the core mantle. When an asteroid collides with the earth, a huge impact force is directly transmitted to the boundary of the core mantle through the crust mantle, thereby changing the equilibrium state of internal and external pressures of the boundary of the core mantle and then promoting the transformation of free electrons from loss to capture to change the direction of the current, and in turn to change the direction of geomagnetism.

18. Laschamp event during Brunhes positive mid-term period; by analysis on the magnetic properties of magma flow near a small village called Laschamp in the central plateau region of France, it is revealed that during the period of 41000 years ago, the direction of the frozen magnetic field lines in the magma is opposite to that of today. This electromagnetic characteristic is known as the Laschamp event. This time is the time when the Neanderthals disappeared from Europe. The peak concentration of radioactive element 10Bb in the ice core taken from the Greenland ice shelf during that period records this event.

In the past 100,000 years in the northern hemisphere, the largest volcanic eruption was the eruption of volcano located in Naples, Italy 39,000 years ago, which produced approximately 350 km$^3$ of rock magma. Three extreme scenarios, i.e., the rapid overturn of the geomagnetic field, drastic changes of climate, and volcanic eruptions in Italy, have been simultaneously proven by sedimentary cores from the Black Sea, indicating that this polarity event is related to volcanic eruptions.

Large-scale volcanoes are generated in the mantle and thermal energy is transmitted in the form of hot mantle plumes. Their large-scale eruptions directly disturb the equilibrium of internal and external pressures of the boundary of the core mantle, thereby changing the entering and exiting direction of free electrons to promote changes in geomagnetic polarity.

19. Cretaceous Normal Superchron; the direction of the geomagnetic field is determined by the direction in which free electrons enter and exit the boundary of the core mantle. The number of electrons contained in the earth core alone cannot sustain the loss of free electrons for 40 million years. The only way is to cycle and replenish the substances to supply the continuous loss of free electrons. The Cretaceous Normal Superchron is achieved in this way.

The Cretaceous period lasted for 79 million years and was the longest stage of the Phanerozoic Eon. During this period, abnormal phenomena throughout the entire history of the earth include the separation of continents by the ocean, accelerated cracking of ocean ridges, intense volcanic magmatism, prolonged geomagnetic polarity, giant metal mineralization, oxygen deficiency in oceanic seawater, rising seawater temperature, rising sea level, intense $CO_2$ gas eruption, and giant oil and gas accumulation in black rock series, the most obvious change is a typical representative of extreme greenhouse climate in the geological history. During this period, the rapid expansion of ocean ridges and large-scale underwater volcanic eruptions formed numerous underwater igneous provinces, including the Pacific Ocean's Onton Java, Hess Ridge, Manihiki, Surviving Island, etc; Gailkeland in the Indian Ocean, Madagascar, the Eastern Plateau of South Africa, and the Brocken Ridge; the Caribbean Sea, Mude Ridge, etc. in the Atlantic Ocean.

All of these evidences indicate that during the Cretaceous period, a large amount of substances and energies were transported from the inside to outside of the earth. When the energies and substances inside the earth were transmitted to the crust through mantle circulation and mantle plumes, oceanic expansion and submarine plateaus were formed, while continental drift was generated so that the original oceanic plates submerge in the mantle to form a descending cold mantle plume. The cold mantle plume and rising hot substances formed a circulation in the mantle, the substance flow enters the earth core due to gravitational differentiation in the layer D", and the thermal energy generated by the core enters the mantle due to high temperature and high pressure, so as to form a material circulation flow in the earth core. In this way, the substances entering the earth core from the mantle introduce abundant electrons which supplement and supply the number of electrons lost by the outer core and then maintain the generation of the current of the original weak magnetic field, thereby forming the Cretaceous Normal Superchron.

20. The relationship between geomagnetic field and climate; the reasons for forming the cold and warm climates are diverse and closely related to the geomagnetic field. The geomagnetic field is an enhanced magnetic field formed by the cutting of the original magnetic field by the outer core. According to Lenz's law, increasing and decreasing the same, the newly formed electromagnetic force hinders the original force it generates, i.e., hinders the amplitude of the circumferential displacement of the inner core. When the geomagnetic field weakens, the displacement amplitude of the inner earth core increases, thereby increasing the amount of gravitational potential energy converted into heat energy and releasing more heat energy from the earth. This is why the strength of the geomagnetic field has a negative correlation with climate in history.

In addition, the weakening of magnetic moment and the Jerk phenomenon in the magnetic field are reasonably explained. These are the explanations for various phenomena of the geomagnetic field without repeated illustration in detail. There may be many answers for explaining a certain phenomenon, but all various conditions are perfectly explained, nothing but the complete theory of the origin of the geomagnetic field proposed by Elsa is supplemented. It also illustrates the origin of the geomagnetic field and also explains the laws of geological movements such as continental drift, various data observed in seismic waves and gravity fields are stated, and various phenomena in the process of paleoclimate and biological evolution are clarified.

The reason for the prosperity of thousands of species on the Earth lies in that the Earth itself is a living organism, and the driving force that governs its activities is gravitation. The law of its life activities can be attributed to one point so as to form a Luhua earth center point which is known as the general term of the three centers:

(1) the center point of the earth is an in-situ point, which is the center of motion of the entire Earth; (2) the displacement trajectory of the central point of the inner earth core is one circle per day and cylindrical per year; (3) the connecting line of the vortex motion center of the liquid outer earth core is a magnetic axis connecting line segment. To this end, such the globe is completed.

For those skilled in the art, it is apparent that the present invention is not limited to the details of the above exemplary embodiments, and under the condition of not deviating from the spirit or basic features of the present invention, the present invention can be implemented in other specific manners. Therefore, for every point, the embodiments shall be regarded as exemplary embodiments and non-restrictive embodiments. The scope of the present invention is limited by the attached claims, rather than the above descriptions, and therefore, all changes aiming to enable the scope of the present invention to fall within the meaning and the scope of equivalent elements of the claims are included in the present invention. Any mark in the drawings of the claims shall not be regarded as the limit to the involved claims.

I claim:

1. A globe, comprising a pedestal, a bracket and a globe body, wherein the globe body is rotatably connected to the bracket, and the bracket is fixedly connected with the pedestal, wherein the globe body has layers A, B, C, D, E, F and G of graticule structures (1) from outside to inside, wherein layer A represents a crust; layers B and C represent upper mantles; layer D represents a lower mantle, layer E represents a liquid outer earth core; layer F represents an earth core transition layer; layer G represents a solid inner earth core; layer E of the globe is provided with a vortex structure (15) from east to west; layer E is provided with a South Atlantic magnetic anomaly structure (17), an African magnetic anomaly structure (18) and an Asian magnetic anomaly structure (19); an H structure is arranged in a center, and is a Luhua earth motion center, which comprises three parts, i.e. a center point (22) of the earth, a circumferential displacement motion trajectory of a center (23) of the inner earth core and a central axis of vortex motion of the liquid outer earth core.

* * * * *